US008704902B2

(12) United States Patent
Naick et al.

(10) Patent No.: US 8,704,902 B2
(45) Date of Patent: Apr. 22, 2014

(54) USING A DISPLAY ASSOCIATED WITH AN IMAGING DEVICE TO PROVIDE INSTRUCTIONS TO THE SUBJECTS BEING RECORDED

(71) Applicant: International Business Machines Corporation, Armonk, NY (US)

(72) Inventors: Indran Naick, Cedar Park, TX (US); Clifford J. Spinac, Austin, TX (US); Calvin L. Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/947,388

(22) Filed: Jul. 22, 2013

(65) Prior Publication Data
US 2013/0300909 A1 Nov. 14, 2013

Related U.S. Application Data

(63) Continuation of application No. 11/849,396, filed on Sep. 4, 2007, now Pat. No. 8,537,227.

(51) Int. Cl.
*H04N 5/235* (2006.01)
*H04N 5/225* (2006.01)

(52) U.S. Cl.
USPC ............. 348/211.11; 348/207.11; 348/136; 348/142; 715/848; 353/28

(58) Field of Classification Search
USPC ............ 348/211.11–211.14, 211.18, 211.19, 348/207.11, 136, 142
See application file for complete search history.

(56) References Cited

U.S. PATENT DOCUMENTS

| | | | |
|---|---|---|---|
| 4,049,907 A | 9/1977 | Damon | |
| 5,923,469 A | 7/1999 | Machtig et al. | |
| 6,262,885 B1 * | 7/2001 | Emma et al. | 361/679.05 |
| 6,532,147 B1 * | 3/2003 | Christ, Jr. | 361/679.27 |
| D491,933 S * | 6/2004 | Guo | D14/315 |
| 6,760,408 B2 | 7/2004 | Crosson et al. | |
| 8,050,030 B2 * | 11/2011 | Wu et al. | 361/679.58 |
| 8,248,772 B2 * | 8/2012 | Dai et al. | 361/679.02 |
| 2002/0161582 A1 | 10/2002 | Basson et al. | |
| 2004/0066914 A1 | 4/2004 | Crosson et al. | |
| 2004/0151491 A1 | 8/2004 | Coleman et al. | |
| 2005/0117073 A1 | 6/2005 | Payne et al. | |
| 2005/0174461 A1 | 8/2005 | Liu | |
| 2005/0174480 A1 | 8/2005 | Nakamura | |
| 2005/0246652 A1 | 11/2005 | Morris | |

(Continued)

OTHER PUBLICATIONS

U.S. Appl. No. 11/849,396, 2 pages.

*Primary Examiner* — Hung Lam
(74) *Attorney, Agent, or Firm* — Francis Lammes; Stephen J. Walder, Jr.; Libby Z. Toub (57) ABSTRACT

A method, computer program product, and system are provided for displaying an image device subject command on an imaging device. The imaging device receives an image device subject command from a user. The image device subject command instructs an action to be performed by a subject being recorded by the imaging device. The imaging device identifies a visual representation that correlates to the image device subject command. The imaging device displays the visual representation of the subject command on a display associated with the imaging device. The visual representation directs the subject being recorded to perform the action.

14 Claims, 5 Drawing Sheets

(56) References Cited

U.S. PATENT DOCUMENTS

| | | |
|---|---|---|
| 2005/0254811 A1 | 11/2005 | Taneoka |
| 2006/0044286 A1 * | 3/2006 | Kohlhaas et al. ............ 345/173 |
| 2006/0111146 A1 | 5/2006 | Kim |
| 2006/0210263 A1 | 9/2006 | Oh |
| 2006/0288389 A1 | 12/2006 | Deutscher et al. |
| 2009/0059037 A1 | 3/2009 | Naick et al. |

* cited by examiner

USING A DISPLAY ASSOCIATED WITH AN IMAGING DEVICE TO PROVIDE INSTRUCTIONS TO THE SUBJECTS BEING RECORDED

BACKGROUND

1. Technical Field

The present application relates generally to an improved data processing system and method. More specifically, the present application is directed to using a display associated with an imaging device to provide instructions to subjects being recorded.

2. Description of Related Art

While some people were born with hearing impairments, other people lose their hearing after learning a language. In addition to normal consequences of aging, people may experience sudden temporary or permanent changes in hearing at any time in their lives. That is, any person who does not currently have a hearing-impairment disability may someday have a stroke, car accident, or other event resulting in a temporary or permanent hearing-impairment disability. It is important to provide accessibility to devices to those persons who are born with, or develop such hearing impairments.

Providing accessibility means removing barriers that prevent people with disabilities from participating in substantial life activities, including the use of services, products, and information. Accessibility is by definition a category of usability. As with any usability measure, accessibility is necessarily defined relative to user task requirements and needs. Graphical user interfaces are not very accessible to sight-impaired users, but relatively accessible to hearing-impaired users.

For example, when a photographer is recording an image of subjects who are hearing impaired, subjects in a noisy environment, or subjects that are too far away to clearly hear directions, directions for the subjects to move closer, move left, move right, etc. must be given verbally, using sign language, through the use of a hand-held prop, or through an interpreter, all of which may distract the subjects being recorded away from looking at the imaging device. In addition, the use of these types of direction techniques may be awkward for the photographer, since the photographer's attention needs to be focused on the imaging device's viewfinder.

SUMMARY

The illustrative embodiments provide mechanisms for using an on-board display of an imaging device to provide visual directions to subjects that are being recorded. The illustrative embodiments provide a user with a method of inputting commands on the imaging device. The processing unit of the imaging device identifies an image or recording that corresponds to the input command and displays the corresponding image or recording on a display that faces the subjects being recorded.

The illustrative embodiments provide for displaying an image device subject command on an imaging device. The illustrative embodiments receive an image device subject command from a user. The image device subject command instructs an action to be performed by a subject being recorded by the imaging device. The illustrative embodiments identify a visual representation that correlates to the image device subject command. The illustrative embodiments display the visual representation of the subject command on a display associated with the imaging device. The visual representation directs the subject being recorded to perform the action.

In the illustrative embodiments the display may be an on-board single-sided display, where the on-board single-sided display is rotated so that the subject being recorded views the visual representation of the subject command. Alternatively, the display may be an on-board dual-sided display, where a first side of the on-board dual-sided display faces the user so that the user views the subject being recorded and a second side of the on-board dual-sided display faces the subject being recorded so that the subject being recorded views the visual representation of the subject command. The second side of the on-board dual-sided display may be a liquid crystal display or a light emitting diode display.

In the illustrative embodiments the display may be coupled to the imaging device via at least one of a wired connection or a wireless connection. In the illustrative embodiments the visual representation may be a still image, a flashing image, text image, sign-language sign image, or an animated gesture image. In the illustrative embodiments the image device subject command may be received via at least one of a keypad, microphone, or a remote control. In the illustrative embodiments the directional command may be a command to move closer, a command to move left, a command to move right, a command to move back, or a command to smile.

In other illustrative embodiments, a computer program producing comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide for using a display associated with an imaging device to provide visual directions to subjects that are being recorded. The illustrative embodiments may be implemented in any imaging device equipped, or capable of being equipped, with a display that may be viewed by a subject at the same time the subject is being recorded. An imaging device may be any type of image capturing devices, such as a light sensitive camera, a video recorder, a digital camera, or the like.

Figure 1:
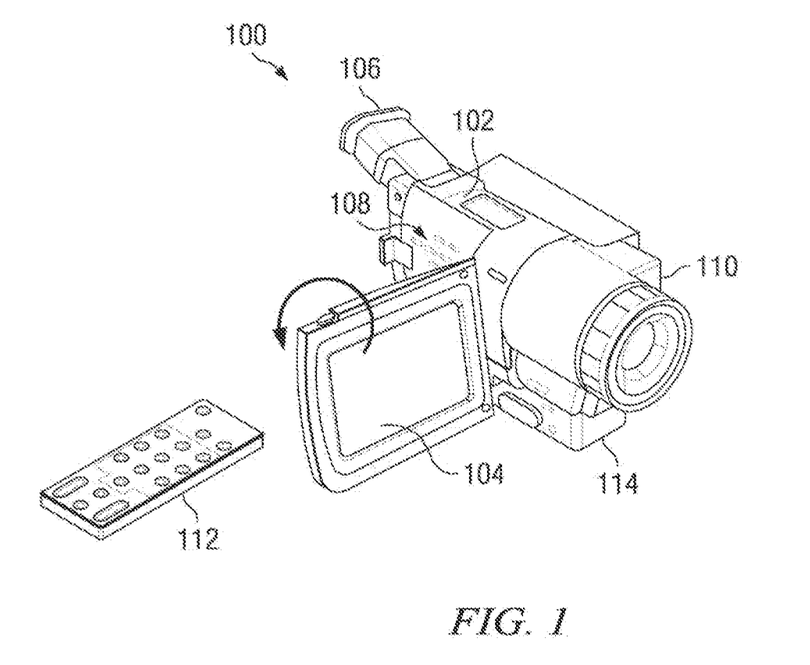
FIG. 1 depicts a pictorial representation of an imaging device in which the illustrative embodiments may be implemented.

With reference now to the figures and in particular with reference to FIG. 1, a pictorial representation of an imaging device in which the illustrative embodiments may be implemented is depicted. Imaging device 100 may include system unit 102, image display 104, viewfinder 106, keypad 108, storage device 110, which may include a digital video disc (DVD), a memory stick, a magnetic tape, or other types of permanent and removable storage media, and remote 112. Remote 112 may be used to remotely operate imaging device 100. Optical signals are converted by system unit 102 into electrical image-signals, which are converted to digital or magnetic signals, which are recorded on storage device 110. Viewfinder 106 may be disposed at the rear of system unit 102 and image display 104 may be disposed on the side of system unit 102, both of which may be used to view the subject which is being recorded at any moment. Battery port 114 is provided at the front of system unit 102 in order to provide a source of electricity for imaging device 100.

While the illustrative embodiments describe viewfinder 106 at the rear of system unit 102, battery port 114 both being disposed at the front of system unit 102 and image display 104 being disposed on the side of system unit 102, the illustrative embodiments are not limited to these locations on system unit 102. That is, viewfinder 106, battery port 114, and image display 104 may be located anywhere on system unit 102. Additionally, image display 104 may be permanently attached, detachable, or connected via a wired or wireless connection to system unit 102. For example, image display 104 may be a television, monitor, or other display device that may be connected to image device 100, so that images being viewed or previously recorded by image device 100 may be displayed on image display 104. While the illustrative embodiments recognize many ways that a display may be coupled to system unit 102, the description below is directed to an on-board display.

Image display 104 may be a single-sided display or a dual-sided display unit. If image display 104 is a single-sided display, image display 104 may be rotated to face the user of imaging device 100 or the subject that is being recorded. If image display 104 is a dual-sided display, the image of the display facing the user may be the view as captured by imaging device 100, such as the subjects being recorded, while the image of the display facing the subjects being recorded may be directions that the user intends the subjects being recorded to follow. Image display 104 may be comprised of one or more of a liquid crystal display (LCD), a plasma display, a cathode ray tube (CRT), a light emitting diode (LED) display, or the like. Whether the display is a single-sided display or a dual-sided display, the display may be protected by display protector, such as a clear plastic cover, or the like.

Figure 2:
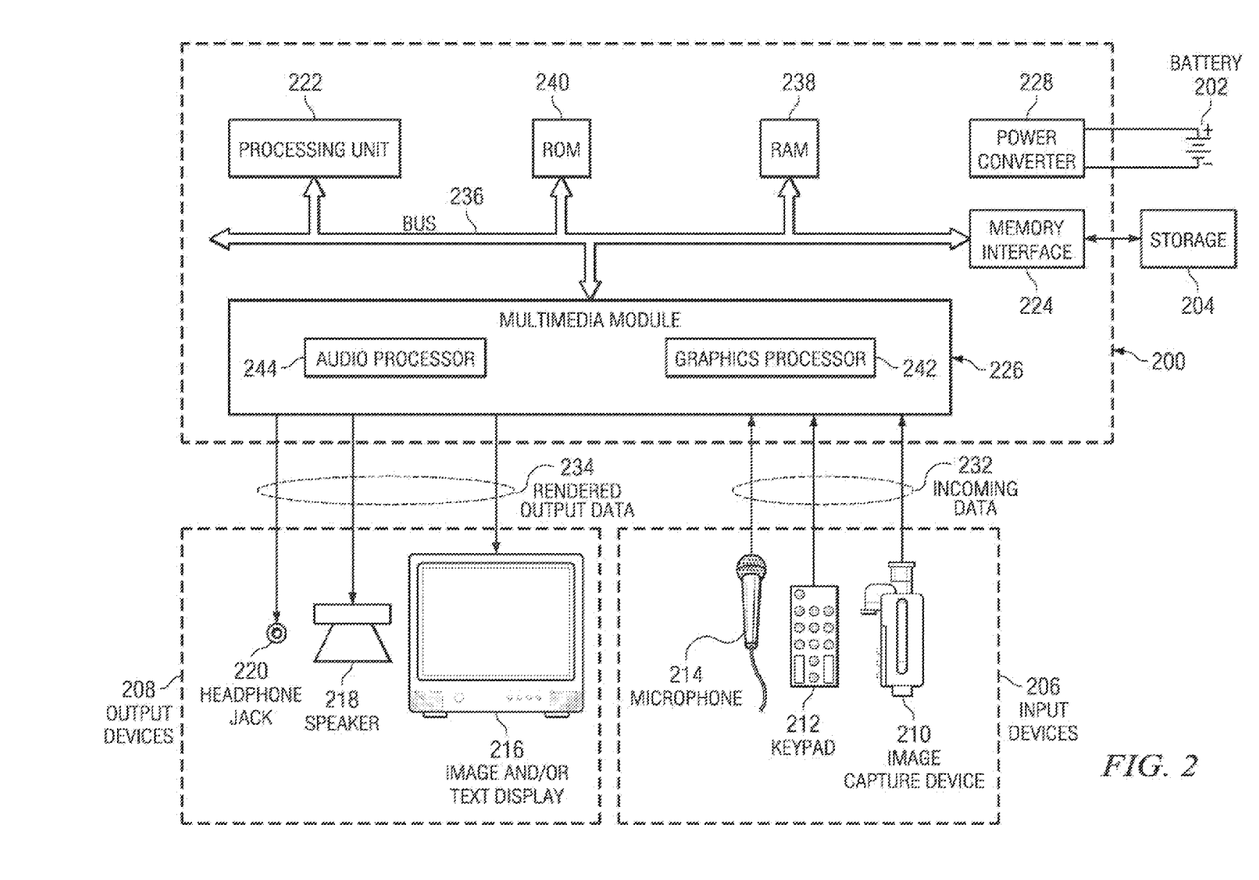
FIG. 2 shows a block diagram of an exemplary data processing system in which aspects of the illustrative embodiments may be implemented.

With reference now to FIG. 2, a block diagram of an exemplary data processing system is shown in which aspects of the illustrative embodiments may be implemented. Data processing system 200 is an example of an imaging device, such as imaging device 100 in FIG. 1, in which computer usable code or instructions implementing the processes for illustrative embodiments of the present invention may be located.

As shown in FIG. 2, data processing system 200 provides for battery input 202, storage 204, one or more input devices 206, and one or more output devices 208. Storage 204 may be any type of storage device. Exemplary input devices 206 are depicted as image capture device 210, keypad 212, and microphone 214, although the illustrative embodiments anticipate that any type of input device may be used, including a keyboard, a mouse, a trackball, and the like. Exemplary output device 208 are depicted as image and/or text display 216, speaker 218, and headphone jack 220, although the illustrative embodiments anticipate that any type of output device may be used, including printers, other data processing systems, and the like. Image and/or text display 216 is an image display similar to image display 104 of FIG. 1, and, as described above, image and/or text display 216 may be a single-sided display or a dual-sided display.

Data processing system 200 may include processing unit 222, memory interface 224, multimedia module 226, and power converter 228. Data processing system 200 may store information received via one of the input devices 206 in storage 204 using memory interface 224. For example, an image received via image capture device 210 may be provided as incoming data 232, digitized via multimedia module 226, and digitally stored in storage 204. Similarly, audio recordings may be received via microphone 214 and processed by multimedia module 226 for storage as audio data in storage 204. Further, keypad 212 may be a keyboard, touch screen interface, remote, or the like, that provides text data to multimedia module 226 as instructions that are to be implemented by processing unit 222 or for a storage as digital text data in storage 204. Processing unit 222 arbitrates write access from multimedia module 226 via bus 236 to storage 204.

Data processing system 200 may retrieve information from storage 204 using memory interface 224 and transmit the information to one of the output devices 208. For example, an image recorded in storage 204 may be sent to image and/or text display 216 as rendered output data 234 and displayed on video and/or text display 216 by graphics processor 242. Similarly, audio recordings recorded in storage 204 may be sent to speaker 218 and/or headphone jack 220 as rendered output data 234 by audio processor 244. Processing unit 222 arbitrates read access from storage 204 via bus 236 to multimedia module 226.

Processing unit 222 executes software which includes instructions for the operation of data processing system 200. Instructions executed by processing unit 222 are located on storage devices, such as random access memory (RAM) 238. The instructions may be programmed during the manufacturing of data processing system 200 as well as updated or additional programming provided by the user through input/output ports (not shown). The processes for illustrative embodiments of the present invention may be performed by processing unit 222 using computer usable program code, which may be located in a memory such as, for example, RAM 238, read-only memory (ROM) 240, or the like, for example. ROM 240 may be, for example, a flash binary input/output system (BIOS).

A bus system, such as bus 236 as shown in FIG. 2, may be comprised of one or more buses. Of course, the bus system may be implemented using any type of communication fabric or architecture that provides for a transfer of data between different components or devices attached to the fabric or architecture.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

The illustrative embodiments provide mechanisms for using an on-board display of an imaging device to provide visual directions to subjects that are being recorded. The illustrative embodiments provide a user with a method of inputting commands on the imaging device. The processing unit of the imaging device identifies an image or recording that corresponds to the input command and displays the corresponding image or recording on a display that faces the subjects being recorded.

Figure 3:
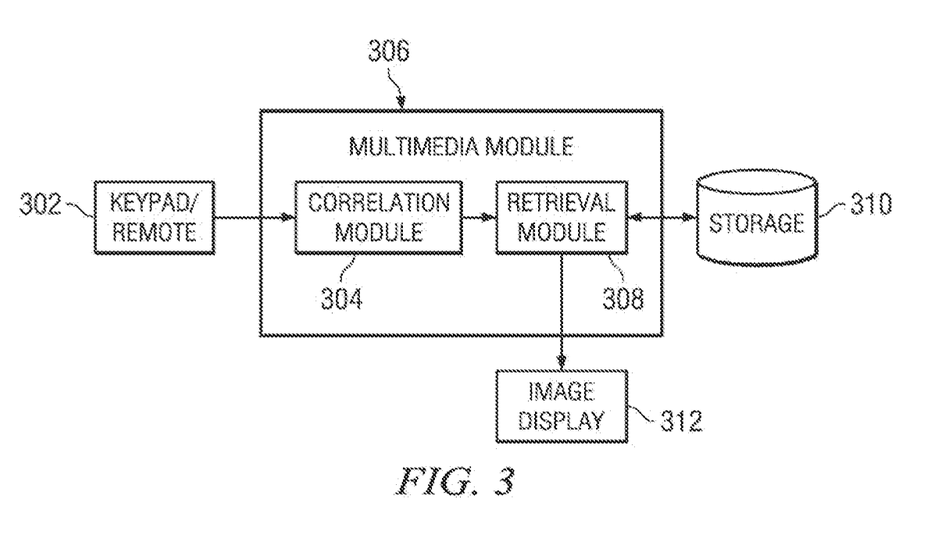
FIG. 3 depicts a functional block diagram of the components used in providing directions to subjects being recorded using an on-board display of an imaging device in accordance with an illustrative embodiment.

FIG. 3 depicts a functional block diagram of the components used in providing directions to subjects that are being recorded using an on-board display of an imaging device in accordance with an illustrative embodiment. To provide visual directions to subjects that are being recorded, a user of an imaging device, such as imaging device 100 of FIG. 1, may input directional commands, which are image device subject commands, using keypad/remote 302, such as keypad 108 or remote 112 of FIG. 1. Correlation module 304 within multimedia module 306 may receive the directional commands as text commands, voice commands, keypad commands, or the like. Correlation module 304 may be equipped with a voice recognition device that converts the received voice commands to text equivalents and a keypad conversion module that converts keypad instruction to text equivalents. Correlation module 304 uses a conversion table or other data structure to correlate the converted text equivalents and received text commands to an image or recording, which is a visual representation of the image device subject command, to be presented to the subjects that are being recorded. Correlation module 304 sends the corresponding image or recording to retrieval module 308. Retrieval module 308 retrieves the corresponding image or recording from storage 310. Image display 312 displays the retrieved image or recording to the subjects being recorded. The retrieved image may instruct the subjects being recorded to move closer, move left, move right, smile, or the like using visual commands that are understandable by the subjects that are being recorded.

Figure 4:
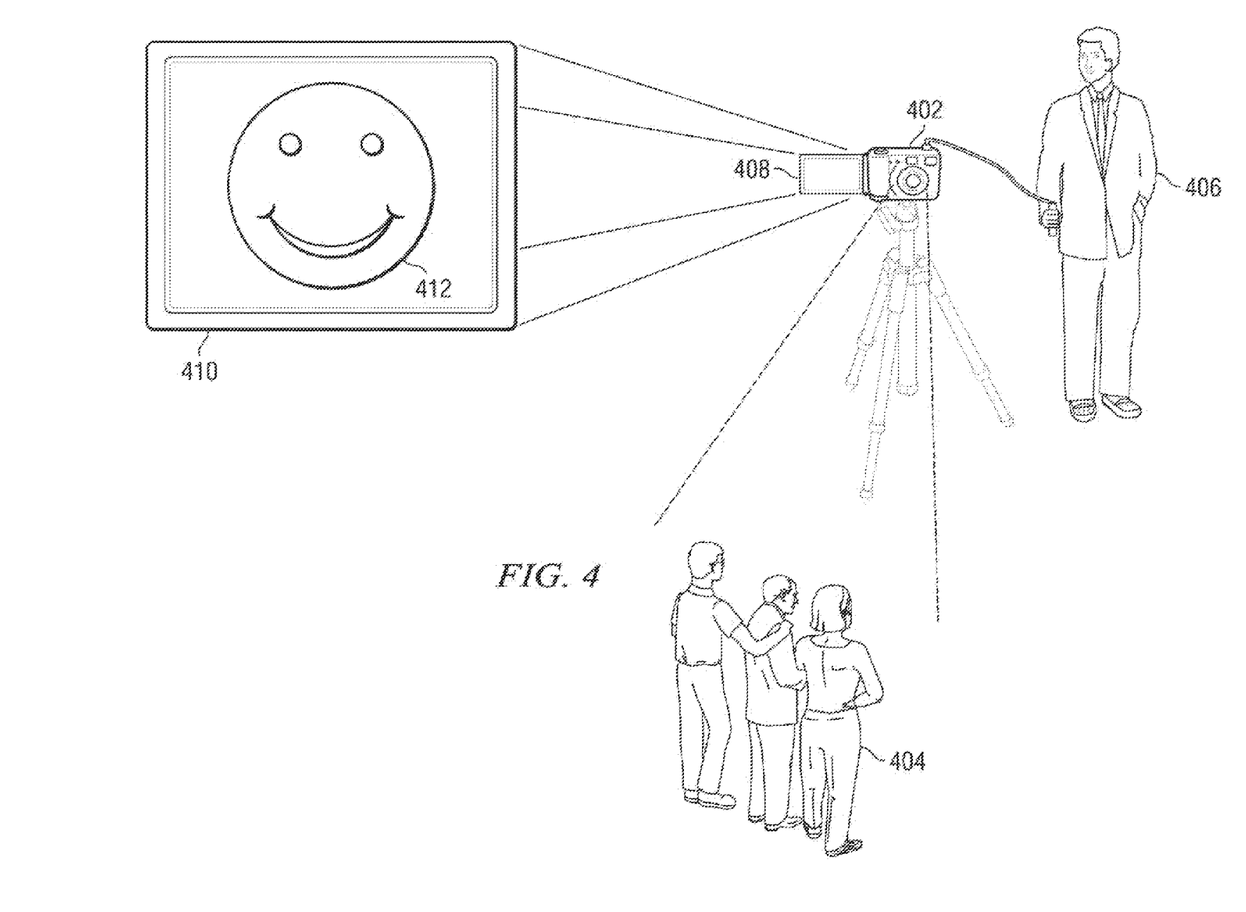
FIG. 4 depicts an exemplary illustration of directing a group of subjects having their image recorded in accordance with an illustrative embodiment.

FIG. 4 depicts an exemplary illustration of directing a group of subjects having their image recorded in accordance with an illustrative embodiment. In this illustrative embodiment, imaging device 402, such as imaging device 100 of FIG. 1, records the image of subjects 404. Subjects 404 may be people who are unable to hear directions from user 406, such as subjects who are hearing impaired, subjects in a noisy environment, or subjects that are too far away to clearly hear directions. During the recording of the image, user 406 may want to direct subjects 404 using directions such as "move left", "move right", "move forward", "move back", "smile", or the like. Since subjects 404 are not able to hear user 406, user 406 may input directional commands into imaging device 402 in order for imaging device 402 to display an image or recording to subjects 404 on image display 408 via an input device built in or coupled to imaging device 402.

User 406 inputs the directional commands as text commands, voice commands, keypad commands, or the like. Imaging device 402 converts voice commands or keypad commands to text equivalents. Imaging device 402 then correlates the converted text equivalents and received text commands to an image or recording that is to be presented to the subjects.

Again, image display 408 may be a single-sided display or a dual-sided display unit. If image display 408 is a single-sided display, image display 408 may be rotated to face user 406 or subjects 404. If image display 408 is a dual-sided display, the image of the display facing user 406 may be of subjects 404 while the image of the display facing subjects 404 may be directions that user 406 intends subjects 404 to follow. For example, magnified display 410 displays happy face image 412, which may direct subjects 404 to smile. While happy face image 412 is used in this example, any type of command or recording may be displayed on image display 408, such as a directional arrow, a flashing directional arrow, a sign-language recording that provides sign-language sign images, animated gesture images, text, or the like.

Figure 5:
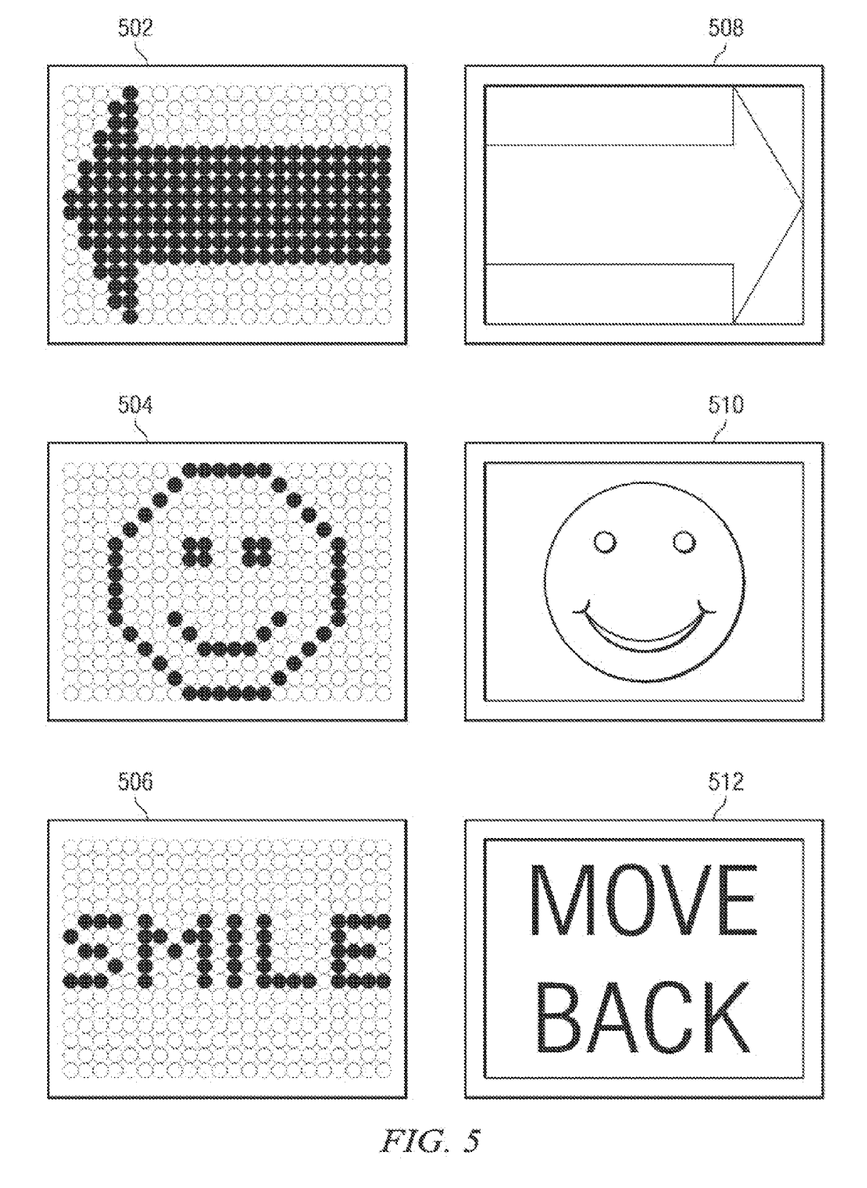
FIG. 5 depicts exemplary directional commands that may be displayed to subjects having their image recorded in accordance with an illustrative embodiment.

FIG. 5 depicts exemplary directional commands that may be displayed to subjects having their image recorded in accordance with an illustrative embodiment.

As shown in FIG. 5, directional commands are displayed that a user of an imaging device wants subjects that are having their image recorded to follow. LED display 502 depicts a left arrow that directs the subjects to move left. LED display 504 depicts a smiley face that directs the subjects to smile. LED display 506 depicts the text "SMILE" that directs the subjects to smile. Display 508 may be a display, such as a LCD, plasma, CRT, or the like, that directs the subjects to move right. Display 510 depicts a smiley face that directs the subjects to smile. Display 512 depicts the text "MOVE BACK" that directs the subjects to move back. The directions displayed on LED displays 502-506 and displays 508-512 are only exemplary. The illustrative embodiment recognizes that any directional command may be displayed using any type of displayable media, for example, displays 508-512 may depict a recording using sign-language sign image or an animated gesture image that may be easily understood by the subjects. Additionally, the image or recording that is displayed may be a still image, a flashing image, a sign-language sign image, an animated gesture image, or the like.

Figure 6:
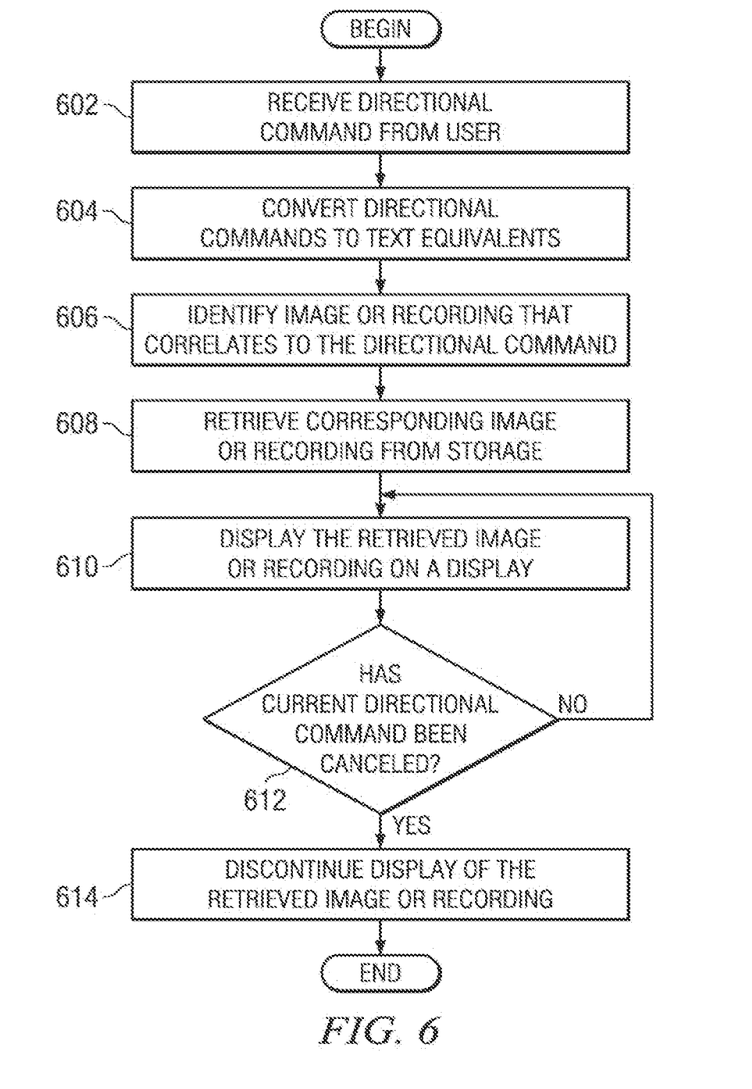
FIG. 6 depicts a flow diagram of the operation performed in displaying directional commands on an imaging device to subjects that are being recorded in accordance with an illustrative embodiment.

FIG. 6 depicts a flow diagram of the operation performed in displaying directional commands on an imaging device to subjects that are being recorded in accordance with an illustrative embodiment. FIG. 6 is a flowchart outlining an exemplary operation according to the invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including program instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As the operation begins, a correlation module, such as correlation module 304 of FIG. 3, receives a directional command from a user via a keypad, remote control, microphone, or the like (step 602). The directional command may be a direction for the subjects to move closer, move left, move right, move back, smile, or the like. The correlation module converts voice commands and keypad commands to text equivalents (step 604). Then the correlation module uses a conversion table or other data structure to correlate the converted text equivalents and received text commands to an image or recording that is to be presented to the subjects (step 606). Once the correlation module identifies the corresponding image or recording, a retrieval module retrieves the corresponding image or recording file from storage (step 608).

Once the corresponding image or recording is retrieved, the retrieval module sends the image or recording to an image display and a graphics processor displays the image or recording on the image display (step 610). The correlation module determines if the current directional command has been canceled (step 612). In canceling the current directional command, the user may select another directional command, cancel the current directional command, power-off the imaging device, change a setting that causes the command to be canceled, or the like. If at step 612 the current directional command has not been canceled, the image display continues to project the retrieved image or recording (step 610). If at step 612 the current directional command has been canceled, the graphics process discontinues displaying the retrieved image or recording (step 614), with the operation terminating thereafter.

Thus, the illustrative embodiments provide for an imaging device that displays an image device subject commands on an imaging device. The imaging device receives an image device subject command from a user. The image device subject command instructs an action to be performed by a subject being recorded by the imaging device. The imaging device identifies a visual representation that correlates to the image device subject command and the imaging device displays the visual representation of the subject command on a display associated with the imaging device. The visual representation directs the subject being recorded to perform the action.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purpose of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through as system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for displaying an image device subject command on an imaging device, the method comprising:

receiving, from a user, an image device subject command that instructs an action to be performed by a subject being recorded by the imaging device;

identifying a visual representation that correlates to the image device subject command; and displaying, on a display associated with the imaging device, the visual representation that directs the subject being recorded to perform the action, wherein the display is a wireless detachable on-board dual-sided display and wherein a first side of the on-board dual-sided display faces the user so that the user views the subject being recorded and a second side of the on-board dual-sided display faces the subject being recorded so that the subject being recorded views the visual representation.

2. The method of claim 1, wherein the second side of the on-board dual-sided display is at least one of a liquid crystal display or a light emitting diode display.

3. The method of claim 1, wherein the display is coupled to the imaging device via at least one of a wired connection or a wireless connection.

4. The method of claim 1, wherein the visual representation is at least one of a still image, a flashing image, text image, sign-language sign image, or an animated gesture image.

5. The method of claim 1, wherein the image device subject command is received via at least one of a keypad, microphone, or a remote control.

6. The method of claim 1, wherein the directional command is at least one of a command to move closer, a command to move left, a command to move right, a command to move back, or a command to smile.

7. A computer program product comprising a non-transitory computer useable medium having a computer readable program, wherein the computer readable program, when executed in a data processing system, causes the data processing system to:

receive, from a user, an image device subject command that instructs an action to be performed by a subject being recorded by the imaging device;

identify a visual representation that correlates to the image device subject command; and display, on a display associated with the imaging device, the visual representation that directs the subject being recorded to perform the action, wherein the display is a wireless detachable on-board dual-sided display and wherein a first side of the on-board dual-sided display faces the user so that the user views the subject being recorded and a second side of the on-board dual-sided display faces the subject being recorded so that the subject being recorded views the visual representation.

8. The computer program product of claim 7, wherein the second side of the on-board dual-sided display is at least one of a liquid crystal display or a light emitting diode display.

9. The computer program product of claim 7, wherein the visual representation is at least one of a still image, a flashing image, text image, sign-language sign image, or an animated gesture image.

10. The computer program product of claim 7, wherein the directional command is at least one of a command to move closer, a command to move left, a command to move right, a command to move back, or a command to smile.

11. A system for displaying an image device subject command on an imaging device, comprising:

a processor; and a memory coupled to the processor, wherein the memory comprises instructions which, when executed by the processor, cause the processor to:

receive, from a user, an image device subject command that instructs an action to be performed by a subject being recorded by the imaging device;

identify a visual representation that correlates to the image device subject command; and display, on a display associated with the imaging device, the visual representation that directs the subject being recorded to perform the action, wherein the display is a wireless detachable on-board dual-sided display and wherein a first side of the on-board dual-sided display faces the user so that the user views the subject being recorded and a second side of the on-board dual-sided display faces the subject being recorded so that the subject being recorded views the visual representation.

12. The system of claim 11, wherein the second side of the on-board dual-sided display is at least one of a liquid crystal display or a light emitting diode display.

13. The system of claim 11, wherein the visual representation is at least one of a still image, a flashing image, text image, sign-language sign image, or an animated gesture image.

14. The system of claim 11, wherein the directional command is at least one of a command to move closer, a command to move left, a command to move right, a command to move back, or a command to smile.

* * * * *